United States Patent
Ketrenos

(10) Patent No.: US 7,308,699 B1
(45) Date of Patent: Dec. 11, 2007

(54) MAINTAINING ACCESS TO A VIDEO STACK AFTER AN APPLICATION CRASH

(75) Inventor: James P. Ketrenos, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/153,369

(22) Filed: Sep. 15, 1998

(51) Int. Cl.
H04N 7/173 (2006.01)
(52) U.S. Cl. .......................................................... 725/91
(58) Field of Classification Search ................ 725/132, 725/91, 114, 116, 100, 142, 93; 712/220, 712/260; 709/231, 232, 236, 310–313; 714/4
See application file for complete search history.

(56) References Cited

U.S. PATENT DOCUMENTS

| | | | | |
|---|---|---|---|---|
| 5,278,838 A | * | 1/1994 | Ng et al. ........................ | 714/6 |
| 5,440,726 A | * | 8/1995 | Fuchs et al. ................... | 714/20 |
| 5,553,239 A | | 9/1996 | Heath et al. ............ | 395/187.01 |
| 5,737,531 A | | 4/1998 | Ehley ..................... | 395/200.38 |
| 5,774,674 A | | 6/1998 | Gutmann et al. ...... | 395/200.67 |
| 5,903,728 A | * | 5/1999 | Semenzato .................. | 709/217 |
| 6,256,393 B1 | * | 7/2001 | Safadi et al. ................ | 380/232 |
| 6,295,092 B1 | * | 9/2001 | Hullinger et al. ........... | 348/468 |
| 6,404,975 B1 | * | 6/2002 | Bopardikar et al. .......... | 386/46 |
| 6,867,682 B2 | * | 3/2005 | Reinhardt et al. ........... | 340/3.5 |

FOREIGN PATENT DOCUMENTS

| | | |
|---|---|---|
| EP | 0 825 535 A2 | 2/1998 |
| EP | 0 274 087 A2 | 7/1998 |
| JP | 6-332734 | 12/1994 |
| JP | 7-319751 | 12/1995 |
| JP | 8-190528 | 7/1996 |
| JP | 10-150639 | 6/1998 |
| JP | 10-232848 | 9/1998 |

OTHER PUBLICATIONS

"Multimedia Online Help Information Enabler," IBM Technical Disclosure Bulletin, vol. 39, No. 3, pp. 341-344, Mar. 1996.

* cited by examiner

*Primary Examiner*—Hunter B. Lonsberry
(74) *Attorney, Agent, or Firm*—Trop, Pruner & Hu, P.C.

(57) ABSTRACT

An application may connect to a video stack through a separate server which uses a window in a separate address space from the video window used by the application to seek video services. If the application crashes, sufficient time will be available to allow the television capture card and the video stack to be shut down in an orderly fashion and to enable them to be reused by subsequent applications without requiring that the computer be rebooted.

32 Claims, 2 Drawing Sheets

MAINTAINING ACCESS TO A VIDEO STACK AFTER AN APPLICATION CRASH

BACKGROUND

This invention relates generally to systems that use video streams and particularly to techniques for maintaining access to those video streams even after an application using the video stream crashes.

Computer systems are often used to provide a television program on a television or monitor connected to the computer which may include a television tuner card. The combination of television and computer offers many advantages. The computer may provide software which facilitates selection of television programs, for example, using electronic program guides. In addition, the television may receive interactive broadcasts which include television programs with accompanying web content. The web content, which may be related to the television program, may provide additional information while allowing the user to respond to inquiries made during the television broadcast. In addition, links may be provided to enable the viewer to link to Internet web sites related to the broadcaster or the broadcast itself.

When an application program calls for television programming, the application program accesses a video stack, a software layer for handling video, which provides a video stream for the application. If the application crashes in the course of the video stream, the video stream may not be properly shut down. As a result, the video stack may not be accessible by another application which has not crashed.

For a subsequent application to access the television video after a crash, it is normally necessary to reboot the computer system to reset the video stack to enable subsequent applications to access that stack. This is awkward for many computer users since the computer user may have other processes ongoing on his or her computer system which then must be interrupted to reboot the computer.

Thus, there is a need for a television video stream system which allows access to the video stack, without rebooting, after an application using the video stack has crashed.

SUMMARY

In accordance with one embodiment, a method for accessing a video stream includes initializing the video stream using a video server when a first application requests video. If the first application crashes, access to the video stream is maintained for a second application through the video server.

DETAILED DESCRIPTION

Figure 1:
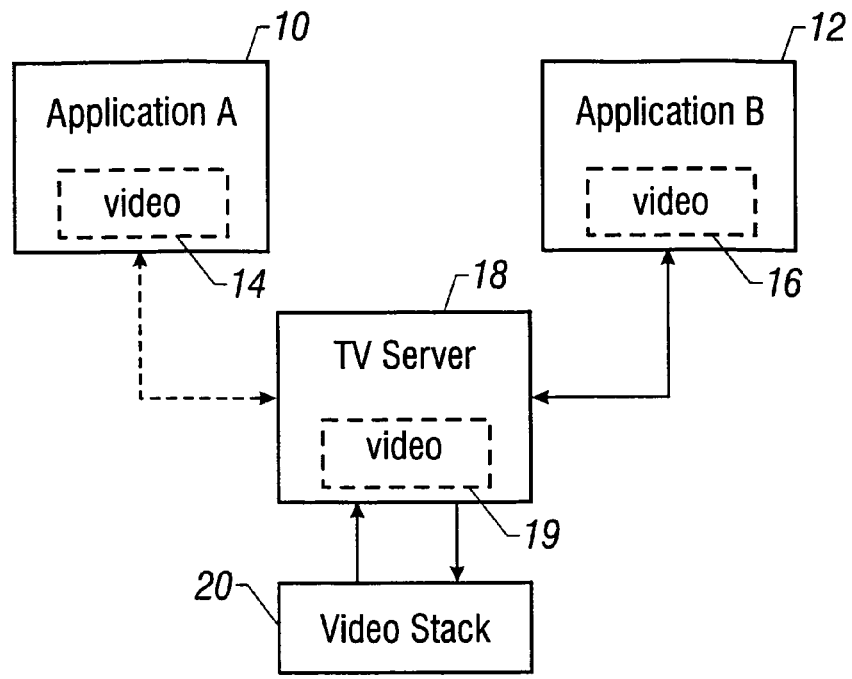
FIG. 1 is a schematic depiction of the interaction of a pair of applications with a video server and a video stack in accordance with one embodiment of the present invention.

An application can access television video through a video server operating through a separate video window at a memory address space distinct from the memory address space of the video window used by the application itself, as indicated in FIG. 1. The video server could be a television video server or a digital video disk (DVD) server as examples. The application "A", indicated by the block 10, sets up a parent video window 14. The parent video window 14 is passed to a video server 18 which then creates a child window 19 of the parent window 14. In effect, then the parent window provides the handle to the child window which provides the handle to the video stack.

The server 18 then places the video in the child window 19. The child window 19 handles the communication between the server 18 and the video stack 20. The video stack 20 may, for example, be Video for Windows or DirectShow, both from Microsoft Corporation. Since the window 14 and the window 19 operate from separate and different address spaces in a computer's memory, if the application A crashes, as indicated in dashed lines in FIG. 1, the window 19 in the TV server 18 may be maintained.

In prior systems, when the application A crashed, the window 14, which provided video services, crashed as well, leaving the video stack 20 in an unusable state. Thereafter, when a separate application, such as the application B in block 12, attempted to access video services, it was unable to do so without rebooting the computer.

In the embodiment shown in FIG. 1, the application 12 may set up its own parent window 14 which then handles the video window 19 in the TV server 18. The application B has immediate access the video stack through the server 18 despite the fact that the application A may have crashed and may no longer be operating. The settings on the server 18 and its video window 19 may continue to be maintained unaffected by the crash of the application A.

Figure 2:
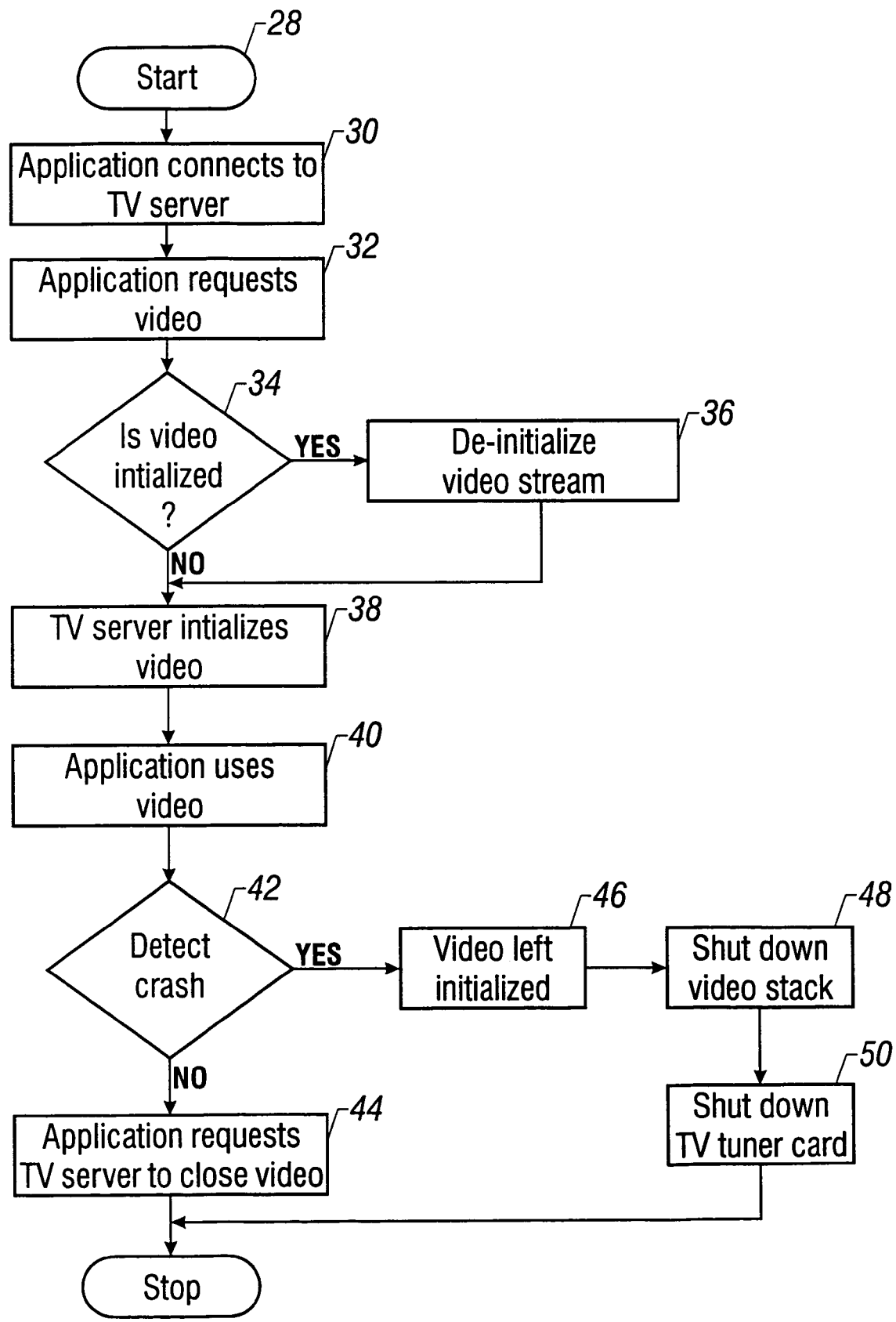
FIG. 2 is a flow chart showing the operation of the system shown in FIG. 1.

Referring now to FIG. 2, a software program for implementing an embodiment of the system described with respect to FIG. 1, begins at 28. An application, such as the application A, connects to a TV server 18, as indicated in block 30. The application requests video (block 32) and an inquiry is made to determine whether video is initialized, as indicated in diamond 34. If so, the video is deinitialized. This restores the video to a known, stable state. If not, the TV server initializes the video using the window provided by the application as the parent window (block 38). The application uses the video for such purposes as desired, as indicated in block 40.

At diamond 42, an inquiry is made to determine whether the application has crashed. The crash detection may be implemented, for example, by monitoring exception handler codes. The software may tie into the operating system and wait for a pre-set exception handler code indicative of a crash. When a particular code is detected, the software determines that a crash is occurring in the application program. In block 48, the video stack is automatically shut down and in block 50 the TV tuner card is also automatically shut down upon detection of a crash.

If no crash is detected, the application eventually requests the TV server to close video when the application is done with the video, as indicated in block 44. As long as the operating system is operating correctly, the application leaves the video initialized, as indicated in block 46.

In the case of a crash, by shutting down the video stack and the TV tuner card quickly upon detecting the error condition, the video stack may be maintained in a usable state for a subsequent application, such as the application B illustrated in FIG. 1. Even though the parent video window 14 may be unusable, the TV server 18 is still running correctly and is able to access the video stack 20 because the server's parent window 19 is operating in a separate address space from the application's window 14.

Video is activated in the windows using handles supplied by the server 18. If there is a crash, the parent window 14 disappears, but the video stack is still connected to the TV server window 19. When a new application starts, it requests video from the TV server 18 and the TV server, unaffected by the crash of the prior application, can then provide a connection to the video stack.

Figure 3:
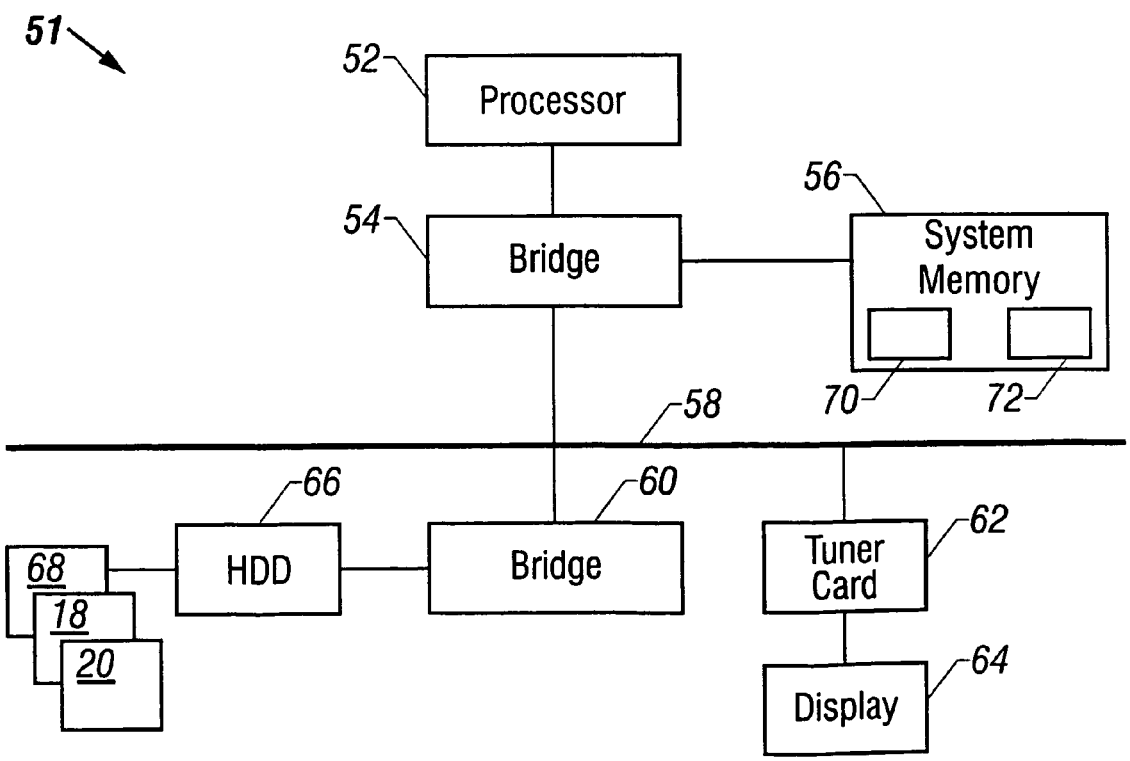
FIG. 3 is a block depiction of a computer implementing one embodiment of the present invention.

Referring now to FIG. 3, an exemplary computer system 51 for implementing an embodiment of the present invention, includes a processor 52 connected to a bridge 54. The bridge 54 is in turn connected to system memory 56. System memory 56 includes a plurality of address spaces including the address spaces 70 and 72. One of the address spaces 70, 72 may be used for the window 19 and the other may be used for the window 14.

The bridge 54 connects to a conventional bus 58. A tuner card 62 may be connected to the bus 58. A display 64 such as a television may be connected to the tuner card 62. A bridge 60 is also connected to the bus 58. The bridge 60 couples a hard disk drive 66 which may store a plurality of software programs including the software to implement the server 18 and video stack 20 as well as an application program 68, which could correspond to the application A or the application B in FIG. 1.

While the present invention has been described with respect to a limited number of embodiments, those skilled in the art will appreciate numerous modifications and variations therefrom. It is intended that the present application cover all such modifications and variations that fall within the true spirit and scope of the present invention.

What is claimed is:

1. A method for accessing a video stream comprising:
   when a first application requests video, initializing the video stream from a video server;
   providing the video stream for the first application;
   monitoring to detect if the first application crashes while receiving the video stream;
   if the first application crashes, maintaining access to the video stream for a second application through the video server; and
   shutting down a television tuner card when a crash is detected.

2. The method of claim 1 including detecting when the first application crashes.

3. The method of claim 2 wherein detecting when the first application crashes includes detecting when the first application crashes by monitoring an exception handler.

4. The method of claim 1, wherein maintaining access to the video stream includes operating said video stream in a separate address space from the first application.

5. The method of claim 1 wherein when a crash is detected, directing the server to release the video stack.

6. The method of claim 1, wherein maintaining access to the video stream includes using software in the second application for accessing said server and software in said server for accessing the video stack.

7. A method for accessing a television video stream comprising:
   connecting an application needing video services to a television server using a window which operates in a separate address space from the application;
   monitoring to determine if the application crashes while receiving the video stream; and
   when the application crashes, automatically shutting down a video stack and a video tuner card.

8. The method of claim 7 including detecting when the application crashes by monitoring an exception handler.

9. The method of claim 7 wherein when a crash is detected, directing the television server to release the video stack.

10. The method of claim 7 including operating a first window in the application for accessing the television server and a second window in said server for accessing the video stack.

11. An article comprising a medium for storing instructions that, if executed, enable a computer to:
    when a first application requests video, initialize a video stream using a video server;
    provide the video stream for the first application;
    monitor to detect if the first application crashes while receiving the video stream;
    if the first application crashes, maintain access to the video stream for a second application through the video server; and
    shut down a television tuner card when a crash is detected.

12. The article of claim 11 including instructions for causing the computer to detect when the first application crashes.

13. The article of claim 12 further including instructions for causing the computer to detect when the first application crashes by monitoring an exception handler.

14. The article of claim 11 including instructions for causing the computer to operate said video stream in a separate address space from the application.

15. The article of claim 11 including instructions for causing the computer to direct the television server to release a video stack when a crash is detected.

16. The article of claim 11 including instructions for causing the computer to operate a first window in the application for accessing the television server and a second window in said server for accessing a video stack.

17. An article comprising a medium for storing instructions for causing a computer to:
    connect an application needing video services to a television server using a window which operated in a separate address space from the application;
    monitor to determine if the application crashes while receiving a video stream; and
    when the application crashes, automatically shut down a video stack and a video tuner card.

18. The article of claim 17 including instructions for causing the computer to detect when the application crashes by monitoring an exception handler.

19. The article of claim 17 including instructions for causing the computer to direct the television server to release the video stack when a crash is detected.

20. The article of claim 17 including instructions for causing the computer to operate a first window in the application for accessing the server and a second window in said server for accessing the video stream.

21. A computer system comprising:
    a processor;
    a television tuner card coupled to a processor,
    a memory coupled to said processor storing programs which cause a computer to:
    connect an application needing video service to a television server using a window which operates in a separate address space from the application;
    monitor to determine if the application crashes while receiving the video stream; and
    when the application crashes, automatically shut down a video stack and the video tuner card.

22. A method of accessing a video stream comprising:
   when a first application requests video, initializing a video stream using a video server; and
   if the first application crashes, maintaining access to the video stream for a second application through the video server and shutting down a television tuner card.

23. The method of claim 22 including directing the server to release the video stack after a crash is detected.

24. A method for accessing video stream comprising:
   in response to a request for video from a first application, initializing a video stream using a video server, and
   if the first application crashes, maintaining access to the video stream for a second application through the video server and directing the server to release the video stack.

25. The method of claim 24 including shutting down the video stack in response to the detection of a crash.

26. An article comprising a medium storing instructions that, if executed, enable a computer to:
   in response to a request for video from a first application, initialize a video stream using a video server; and
   if the first application crashes, maintain access to the video stream for a second application through the video server and shut down a television tuner card.

27. The article of claim 26 further storing instructions that, if executed, enable the computer to detect when the first application crashes.

28. An article comprising a medium storing instructions that, if executed, enable a computer to:
   in response to a request for video from a first application, initialize a video stream using a video server,
   if the first application crashes, maintain access to the video stream for a second application through the video server;
   operate a first window in the application for accessing the television server and a second window in the server for accessing a video stack; and
   shut down a television tuner card when a crash is detected.

29. The article of claim 28 further storing instructions that, if executed, enable a computer to shut down a video stack when a crash is detected.

30. The article of claim 28 further storing instructions that, if executed, enable the computer to detect when the first application crashes.

31. The method of claim 1 including shutting down the video stack when a crash is detected.

32. The article of claim 11 including instructions for enabling the computer to shut down a video stack when a crash is detected.

* * * * *